United States Patent
Lee et al.

(10) Patent No.: US 11,344,885 B2
(45) Date of Patent: May 31, 2022

(54) MODULAR MICROFLUIDIC SYSTEM

(71) Applicant: Research & Business Foundation Sungkyunkwan University, Suwon-si (KR)

(72) Inventors: Jinkee Lee, Suwon-si (KR); Ryungeun Song, Gangneung-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 218 days.

(21) Appl. No.: 16/697,430

(22) Filed: Nov. 27, 2019

(65) Prior Publication Data
US 2020/0171497 A1 Jun. 4, 2020

(30) Foreign Application Priority Data
Nov. 29, 2018 (KR) .......................... 10-2018-0150725

(51) Int. Cl.
*B01L 3/00* (2006.01)
*B01L 9/00* (2006.01)
*B01J 19/00* (2006.01)

(52) U.S. Cl.
CPC ......... *B01L 3/502715* (2013.01); *B01L 9/527* (2013.01); *B01J 19/0093* (2013.01); *B01L 2200/027* (2013.01); *B01L 2200/028* (2013.01); *B01L 2200/10* (2013.01); *B01L 2200/12* (2013.01)

(58) Field of Classification Search
CPC .. B01L 3/502715; B01L 3/5027; B01L 9/527; B01L 2200/027; B01L 2200/028; B01L 2200/0689; B01L 2200/10; B01J 19/0093
See application file for complete search history.

(56) References Cited

U.S. PATENT DOCUMENTS

| 6,827,096 | B1 | 12/2004 | Kayukawa |
| 7,569,127 | B1* | 8/2009 | Cho ................. B01L 3/502715 137/833 |
| 2002/0124896 | A1* | 9/2002 | O'Connor ............. B01F 25/432 137/833 |
| 2005/0255003 | A1* | 11/2005 | Summersgill ........... B01F 33/30 422/606 |
| 2008/0017306 | A1* | 1/2008 | Liu ....................... B01F 33/453 422/503 |
| 2018/0078936 | A1 | 3/2018 | Owens et al. |

FOREIGN PATENT DOCUMENTS

KR  10-2014-0015941 A  2/2014

* cited by examiner

*Primary Examiner* — Brian J. Sines
(74) *Attorney, Agent, or Firm* — NSIP Law

(57) ABSTRACT

A modular microfluidic system includes a first microfluidic module and a second microfluidic module. The first microfluidic module has a first module body including a microfluidic channel and a first connector extending outward from the module body. The first connector is provided with a protrusion. The second microfluidic module has a second module body including a microfluidic channel, a second connector including a guider configured to guide the protrusion upon insertion of the first connector into the second module body, and a locker configured to fix the protrusion. Upon fluidly coupling the first microfluidic module and the second microfluidic module, an O-ring is disposed between the first connector and the second connector.

11 Claims, 12 Drawing Sheets

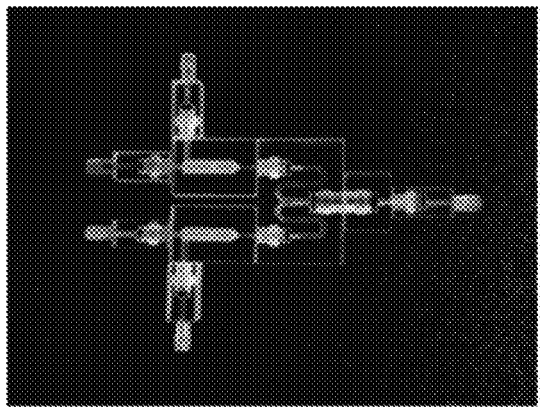
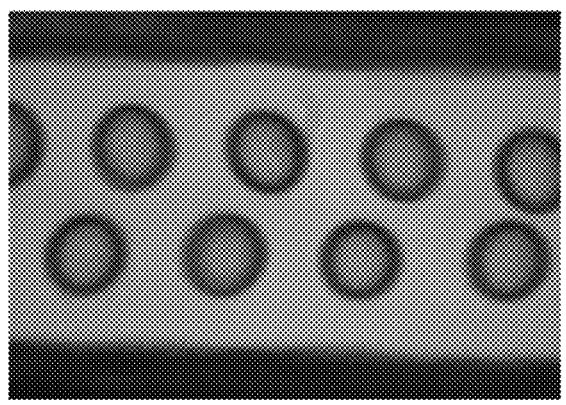
fig. 7 (a)
fig. 7 (b)

(i)

(ii)

(iii)

(iv)

(v)

(vi)

MODULAR MICROFLUIDIC SYSTEM

CROSS-REFERENCE TO RELATED APPLICATION

This application claims the benefit under 35 USC 119(a) of Korean Patent Application No. 10-2018-0150725, filed on Nov. 29, 2018 in the Korean Intellectual Property Office, the entire disclosure of which is incorporated herein by reference for all purposes.

BACKGROUND

1. Field

The disclosure relates to a modular microfluidic system.

2. Description of the Related Art

A microfluidic system has been widely applied to not only a micro total analysis system (mTAS), a lab-on-a-chip, a microchemical reactor, biological analysis, cellomics, drug delivery, tissue engineering and the like biochemistry fields as well as physics, chemistry, engineering and biotechnology of studying and controlling fluids inside a micrometer scale channel, but has also been recently used to achieve a microstructure in a material field, such as a colloid assembly, colloid photonic crystal, thin-film transistor manufacture, etc.

In such example, the microfluidic system needs to be designed to serve its purpose so that the desired function can be performed appropriately. However, redesign for this system may sometimes be required during optimization or every time when a used fluid or the like condition is changed. If the whole system is remanufactured whenever there is a need for changing the design, it is very inefficient in terms of cost and time. Besides, it is very complicated to apply an electrode based on the existing soft lithography and the like additional functions to the microfluidic system.

Adhesion-based connection not only makes it difficult to assemble and disassemble the modules but is also likely to cause leakage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a modular microfluidic system includes a first microfluidic module and a second microfluidic module. The first microfluidic module has a first module body including a microfluidic channel and a first connector extending outward from the module body. The first connector is provided with a protrusion. The second microfluidic module has a second module body including a microfluidic channel, a second connector including a guider configured to guide the protrusion upon insertion of the first connector into the second module body, and a locker configured to fix the protrusion. Upon fluidly coupling the first microfluidic module and the second microfluidic module, an O-ring is disposed between the first connector and the second connector.

The O-ring may seal fluid flowing through the first microfluidic module and the second microfluidic module from leaking.

Upon engaging the first microfluidic module and the second microfluidic module, the protrusion guided along the guider may be rotatable at a predetermined angle and lockable to the locker.

The second connector may further include an accommodating portion configured to accommodate a portion of the first connector corresponding to an upper end of the protrusion and the O-ring.

The O-ring may be compressable to have a width of about 70% of a depth of the O-ring when the first microfluidic module and the second microfluidic module are coupled. The the depth of the O-ring may be a diameter of the O-ring.

Each of the first and the second microfluidic modules may be manufacturable by a 3D printer, and transparent films may be attached to upper and lower ends of the first and the second microfluidic modules.

In another general aspect, a modular microfluidic system includes a first microfluidic module, a second microfluidic module, and a resilient member. The first microfluidic module includes a microfluidic channel and a first connector extending outward from the first microfluidic module. A side surface of the first connector includes a protrusion. The second microfluidic module includes a microfluidic channel, a second connector comprising a guider configured to guide the protrusion upon insertion of the first connector into the second microfluidic module, and a locker configured to fix the protrusion. The resilient member has a through hole. The resilient member is disposed between the first microfluidic module and the second microfluidic module to fluidly communicate the first microfluidic module with the second microfluidic module.

Upon engaging the first microfluidic module and the second microfluidic module, the protrusion guided along the guider may be rotatable at a predetermined angle and lockable to the locker.

The second connector may further include an accommodating portion configured to accommodate a portion of the first connector corresponding to an upper end of the protrusion and the resilient member.

The resilient member may be compressable to have a width of about 70% of a diameter of the resilient member when the first microfluidic module and the second microfluidic module are fluidly coupled.

Other features and aspects will be apparent from the following detailed description, the drawings, and the claims.

BRIEF DESCRIPTION OF THE DRAWINGS

FIGS. 6(a) to 9(b) illustrate examples of various droplet generators embodied using a microfluidic system and droplets generated by these droplet generators.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figures 1A, 1B:
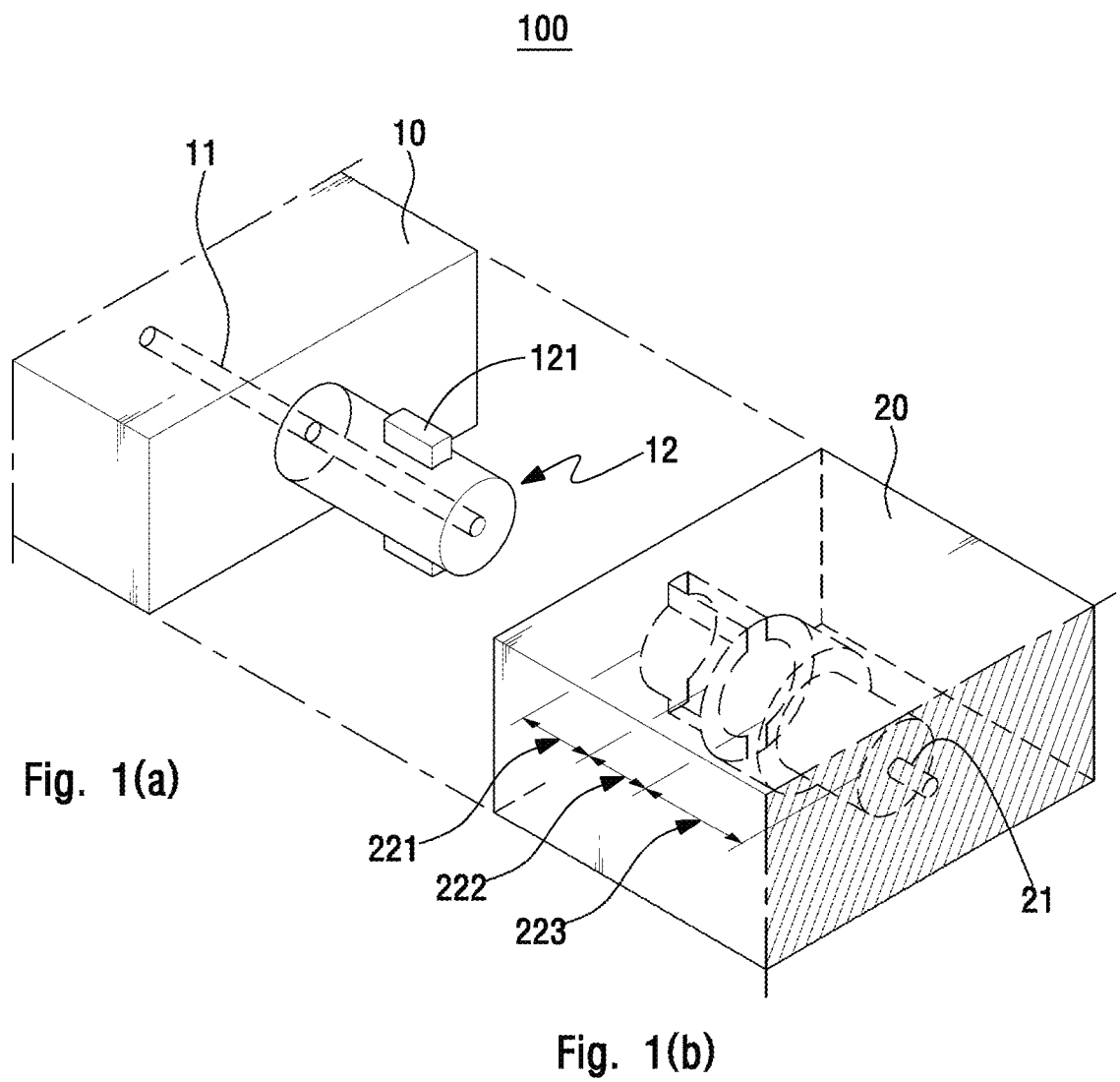
FIGS. 1(a) and 1(b) illustrate examples of connectors in a microfluidic module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIGS. 1(a) and (b) illustrate examples of connectors in a microfluidic module. The microfluidic module 100 may include any and every module that has a function to be described later. Although it is roughly illustrated in the drawings that a module body has a hexahedral shape and a connector has a cylindrical shape, the module body and the connector are not limited to those shown in the drawings.

An example of a configuration of the microfluidic module 100 having at least one male connector with a protrusion 121 will be described with reference to FIG. 1(a).

As shown therein, the microfluidic module 100 includes a module body 10 including a microfluidic channel 11 allowing fluid to flow therein, and a first connector 12 extended outward from the module body 10 and provided with the protrusion 121.

In this example, the microfluidic channel 11 is also formed inside the first connector 12, so that the fluid flowing in the microfluidic module 100 can flow out through the module body 10 and the first connector 12.

The protrusion 121 may be formed on a circumference of the first connector 12. Although it is illustrated that a pair of protrusions 121 is provided to provide relatively stable coupling, one or more protrusions 121 may be provided as necessary without limiting the number of protrusions 121. Although it is also illustrated that the protrusion has a block shape, the protrusion may have any shape without being limited to the block shape as long as it can be stably locked to a locker of another microfluidic module to be described below.

Further, the protrusion 121 may be positioned to directly extend from the end of the first connector 12 and/or underneath the end of the first connector 12 in order to more stably couple the microfluidic modules and prevent leakage.

An example of a configuration of the microfluidic module having at least one female connector with a locker 222 will be described with reference to FIG. 1(b).

As shown therein, the microfluidic module includes a module body 20 including a microfluidic channel 21 allowing fluid to flow therein, and a second connector 22 provided with a guider 221 guiding the protrusion 121 of another microfluidic module inserted in the module body 20 and the locker 222 to which the protrusion 121 is locked. In addition, the second connector 22 may further include an accommodating portion 223 to accommodate a portion of the first connector 12 of another microfluidic module corresponding to an upper end of the protrusion 121 and an O-ring.

In this example, the microfluidic channel 21 may be formed even inside the second connector 22, so that a fluid flowing in the microfluidic module can flow out through the second connector 22 and the module body 20.

The guider 221 serves to guide the protrusion 12 of another microfluidic module to be inserted in the module body 20. The present drawings illustrate that the guider 221 is shaped like a long slit, but the shape of the guider 221 is not limited to a long slit. For an accurate and rapid guide, this slit may have a width substantially the same as or slightly larger than that of the protrusion 121 to be guided.

The locker 222 serves to make the protrusion 121 inserted along the guider 221 be locked and prevented from being inadvertently separated. The accommodating portion 223 provides a space for accommodating a portion of the first connector 12 of another microfluidic module corresponding to an upper end of the protrusion 121 and the O-ring. The locker 222 and the accommodating portion 223 will be described in more detail with reference to FIGS. 2 and 3.

Figure 2:
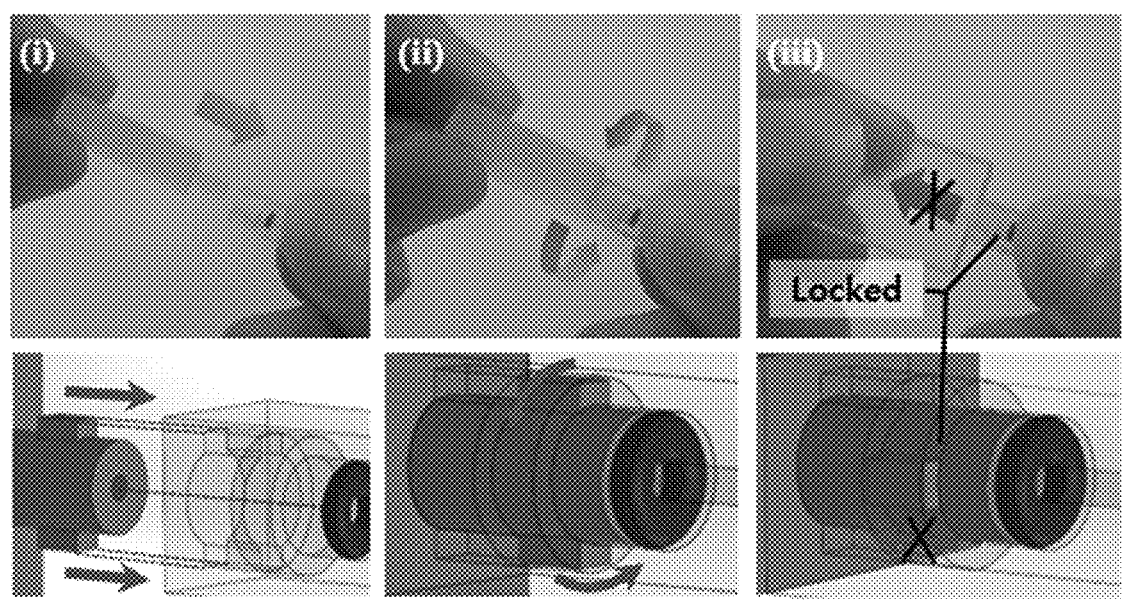
FIG. 2 illustrates an example of a coupling method between modules.

FIG. 2 illustrates an example of a coupling method between modules. In FIG. 2, the upper side shows actual images of a stepwise coupling method, and the lower side schematically shows the stepwise coupling method. Referring to FIG. 2, coupling between the modules is carried out by (i) inserting the male connector along the guider 221 of the female connector, and (ii) rotating the male connector at a predetermined angle, for example, at an angle of 90 degrees to the female connector, thereby (iii) causing the protrusion 121 of the male connector to be locked in prevented from being advertently separated from the locker 222 of the female connector. The present drawings illustrate that the male connector is rotated at the right angle to the female connector, but the male connector may be rotated at any angle within a range from an angle of getting out of the guider 221 to 180 degrees.

In this example, the locker 222 provides an empty space in which the protrusion 121 of the first connector 12 inserted along the guider 221 can be rotated and has a predetermined thickness so that the rotated protrusion 121 can be locked and prevented from being inadvertently separated. For smooth rotation and stable coupling after the rotation, the locker 222 may have substantially the same thickness as or be slightly thinner than the protrusion 121. In addition, the locker 222 may have an empty space within which the rotation of the protrusion 121 is allowed up to only a predetermined angle, and the other space beyond the angle may be not empty.

Figure 3:
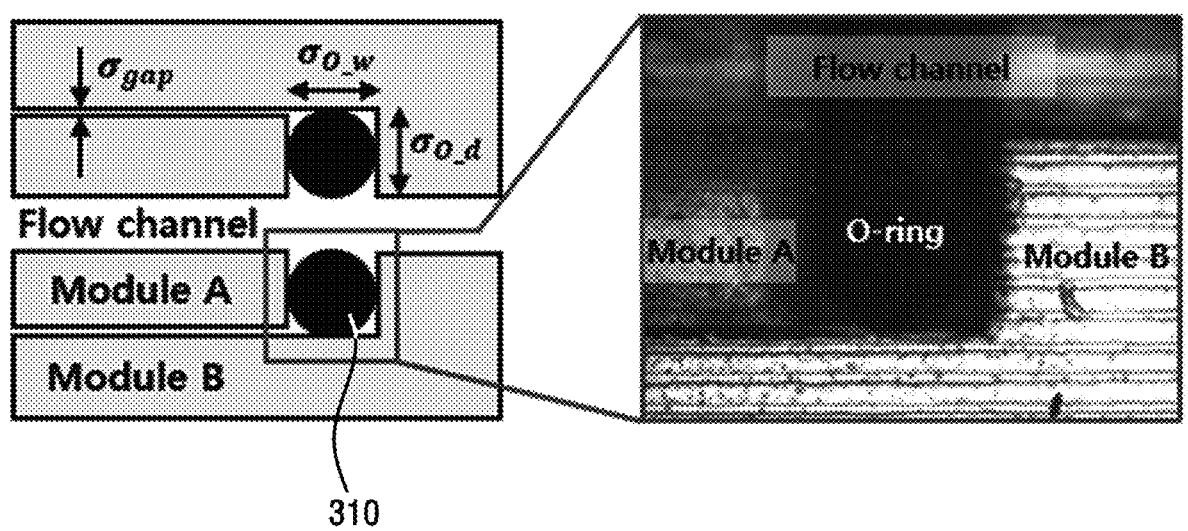
FIG. 3 is a lateral cross-section view of an example of modules coupled.

FIG. 3 is a lateral cross-section view of an example of modules coupled. Referring to FIG. 3, module A and an O-ring 310 are accommodated in module B. The section of module B shown in FIG. 3 may be regarded as the accommodating portion 223, providing a space in which the portion of the first connector 12 of another microfluidic module corresponding to the upper end of the protrusion 121 and the O-ring 310 are accommodated. Here, a gap $\sigma_{gap}$ refers to tolerance for making it easy to couple the modules, and may, for example, be 0.05 mm. A depth $\sigma_{O-d}$ of the O-ring 310 is defined to be equal to the thickness of the O-ring 310. As a desired factor on which coupling performance between the modules depends, a width $\alpha_{O-w}$ of the O-ring 310 is defined as a value of when the O-ring 310 is compressed and is smaller than the depth $\sigma_{O-d}$.

Figure 4:
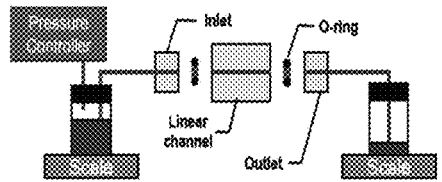
FIG. 4(a) illustrates an example of an experimental structure for optimizing an O-ring dimension.
FIG. 4(b) is a graph showing an example of a leakage ratio over a compression ratio of an O-ring in an experiment.
FIG. 4(c) is a graph showing an example of a flow rate ratio over a compression ratio of an O-ring in an experiment.
Figure 4:
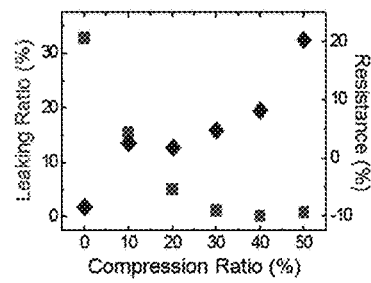
Figure 4:
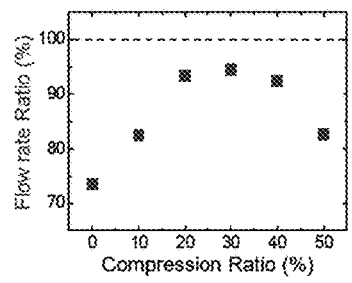

To prevent leakage of fluid and minimize hydraulic resistance in the accommodating portion 223 in which the modules are coupled, there is a desire to properly designing the size of the connectors 12 and 22, the gap between the connectors 12 and 22, the standards of the O-ring 310, etc. Such design of the O-ring 310 will be described with reference to FIG. 4.

FIG. 4(a) illustrates an example of an experimental structure for optimizing an O-ring dimension. FIG. 4(b) is a graph showing an example of a leakage ratio over a compression ratio of an O-ring in an experiment. FIG. 4(c) is a graph showing an example of a flow rate ratio over a compression ratio of an O-ring in an experiment.

Referring to FIG. 4(a), the leakage ratio and the flow rate ratio over the compression ratio of the O-ring are measured to determine the optimum width $\sigma_{O-w}$ of the O-ring. The connected channels, with the O-ring therebetween, are all shaped like a cylindrical tube and configured to measure the mass of water at an inlet and an outlet while allowing for applied pressure. With this configuration, a theoretical value of the flow rate ratio is calculated with respect to the applied pressure, e.g. 1 kPa, and the flow rate ratio is measured based on variation in the mass of water measured at the inlet and the outlet, thereby obtaining the graphs shown in FIG. 4(b) and FIG. 4(c).

As shown in FIG. 4(b), when the compression ratio of the O-ring is lower than 30%, leakage occurs, thereby causing loss of fluid. On the other hand, when the compression ratio of the O-ring is higher than or equal to 30%, the leakage rarely occurs, thereby causing no loss of the fluid. However, when the compression ratio of the O-ring is higher than or equal to 50%, the O-ring itself invades the channel for flowing the fluid therein, and obstructs the flow of the fluid, thereby increasing resistance by up to 20% theoretical resistance. Consequently, as shown in FIG. 4(c), when the compression ratio of the O-ring is 30%, the flow rate ratio closest to the theoretical value is obtained. In other words, when the width of the O-ring is about 70% the depth of the O-ring, the connectors 12 and 22 have the minimum effect on the O-ring, thereby optimizing the performance of the connectors 12 and 22.

FIGS. 5(a)-(l) illustrate examples of a microfluidic module including, at least, one female or male connector. The modules in FIGS. 5(a) and (c) may have only a female connector, the modules in FIGS. 5(d), (f), (g), (h), (i), (j) and (l)) may have only a male connector, and the modules FIGS. 5(b), (e) and (k) may have combination of both female connector and male connectors, but the modules are not limited to those shown in FIGS. 5(a)-(l). For example, even though the module shown in FIG. 5(g) has only a male connector, the module in FIG. 5(g) may be changed to have only a female connector or have a combination of female connector and male connectors. Likewise, this change may be applicable to all the example modules shown in FIGS. 5(a)-(l).

The microfluidic modules may be modularized according to functions, and may, for example, include the modules, as shown in the present drawings. However, the modules are not limited to those shown in the present drawings. FIG. 5(a) provides an example function of an inlet/output through which the fluid is injected into or discharged from the microfluidic system. FIGS. 5(b), (c) and (d) are examples of connectors usable for connecting between functional modules and may be selected according to the shapes of the connectors that the functional modules to be connected have. FIGS. 5(e) and (f) are examples of junction modules that may, for example, be used for connection between three microfluidic modules for injecting/discharging or mixing different fluids. In the junction modulus according to the disclosure, the number of connectors is not limited to those shown in the drawings. As necessary, a plurality of junction modules may be used for injecting/discharging or mixing two or more fluids. FIGS. 5(g) and (h) are respectively an example of a two-dimensional (2D) mixer and a three-dimensional (3D) mixer, which are provided to control flow of a fluid flowing inside the modules, thereby achieving desired characteristics, speed, etc. of the fluid.

Figure 5:
FIGS. 5(a)-5(l) illustrate examples of a microfluidic module.
Figure 5:
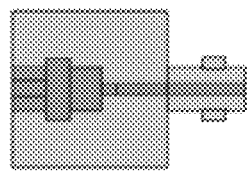
Figure 5:
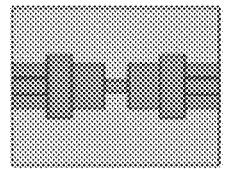
Figure 5:
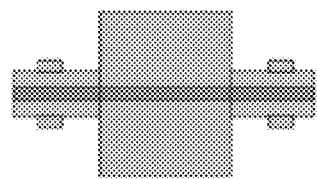
Figure 5:
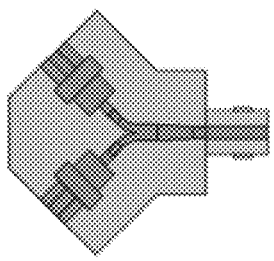
Figure 5:
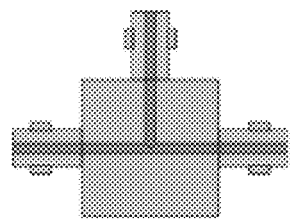
Figure 5G:
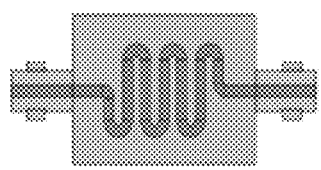
Figure 5:
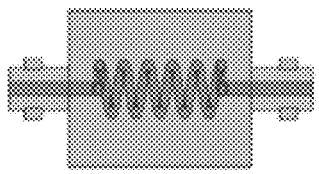
Figure 5:
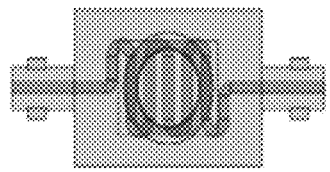
Figure 5J:
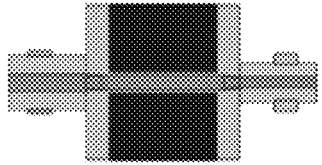
Figure 5:
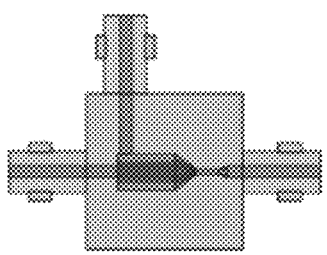
Figure 5:
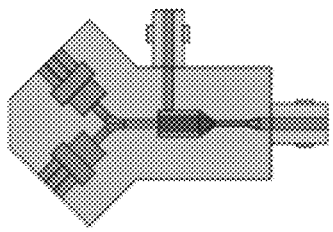
Figure 6:
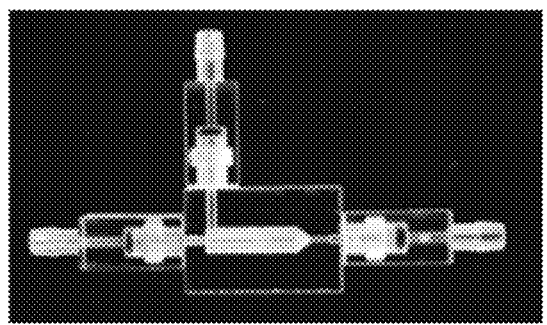
Figure 6:
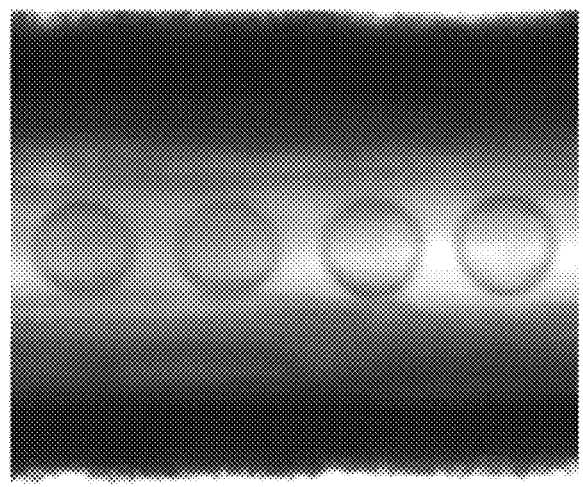

The modules to be described below are modules that provide functions for applying additional operations to the flow of the fluid, in which FIG. 5(i) is a module provided to expose the fluid to light, and FIG. 5(j) is a module with an additional electrode. Further, FIGS. 5(k) and (l) are examples of modules that are respectively used in generating a droplet, and dual droplets. The modules FIG. 5(i) and/or FIG. 5(j) may be used in association with a droplet generation module such as (k) and/or (l) to physically/chemically control the droplets, rather than used independently. For example, the electrode module FIG. 5(j) may be used in making the generated droplet to have an elliptical shape, separating an inner droplet, or combining different droplets. The exposure module FIG. 5(i) may be used in employing light to sense the inside of the channel or cure a droplet of photocurable resin.

Such microfluidic modules, according to the disclosure, may be manufactured by a general printing process of a 3D printer. For example, the SolidWorks program is used to make a 3D drawing for the microfluidic module, and MJP 2500 plus of the 3D System is used to get a printout. In this case, a transparent VisiJet M2R-CL may, for example, be used with a VisiJet M2R-SUP made of wax and serving as supporting material. Then, the printout is subjected to a process of primarily melting and removing the wax from the interior and exterior of the microfluidic module inside a drier at a temperature of 80° C. for about 15 minutes, for example. When the wax is completely melted, the microfluidic module is soaked into an oil bath for about 20 minutes, for example, to remove the wax. At this time, the oil bath is warmed up based on a double-boiler with water at a temperature of 100° C., for example, so as to prevent the wax from being hardened. After the wax is removed through the oil bath, the microfluidic module is soaked into water blended with a surfactant for 15 minutes, for example, so that a sonicator can remove remaining oil. Last, the microfluidic module is washed out again by the sonicator as soaked into deionized (DI) water for 15 minutes, for example, and then dried in the drier at a temperature of 80° C., for example.

The microfluidic module manufactured as above is translucent due to its surface roughness, even though it is made of transparent material. To improve visibility the interior channel of the microfluidic module and give an additional function, the microfluidic module may be additionally subjected to the following process.

Figure 11:
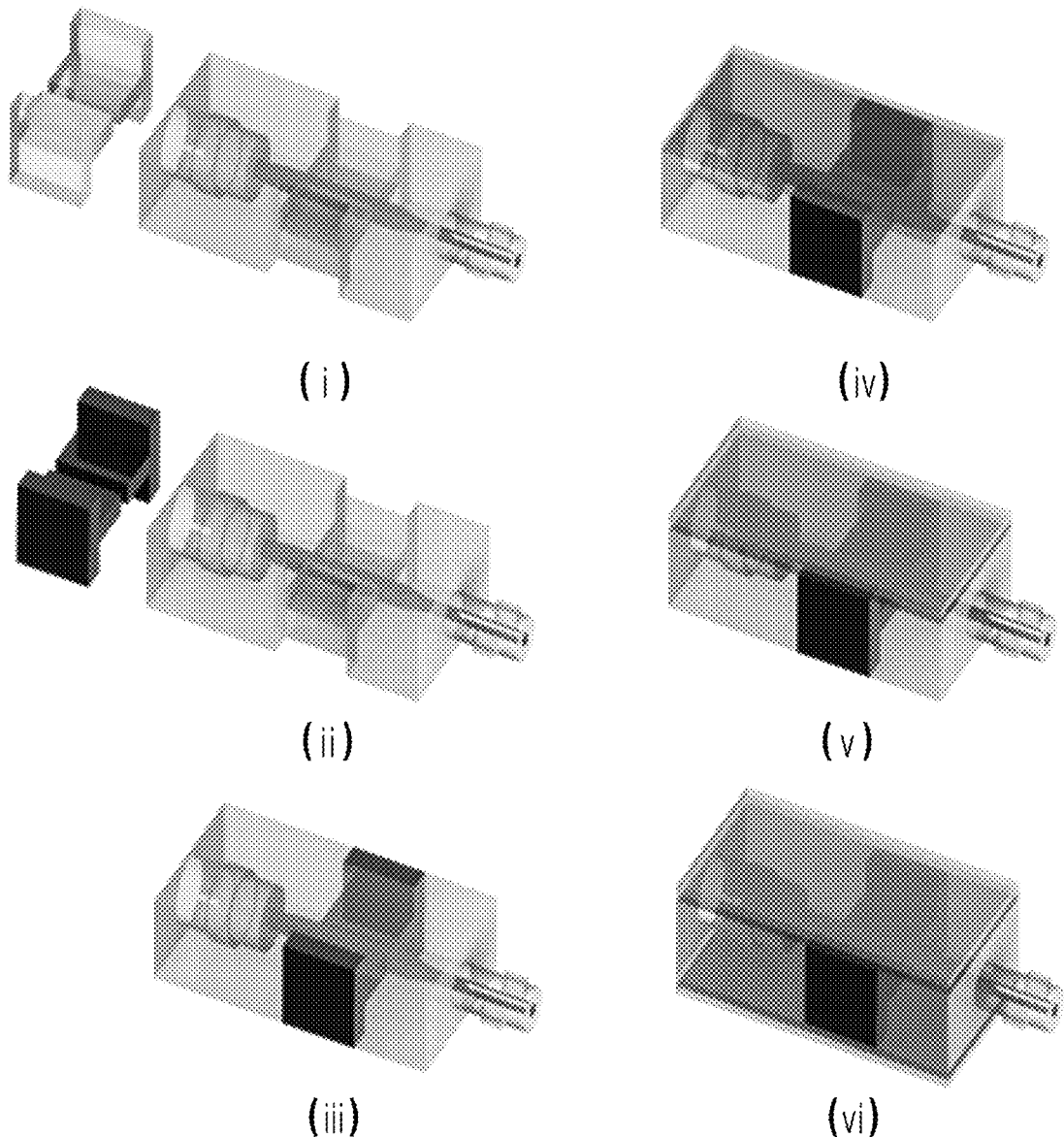
FIG. 11 illustrates an example of a process of manufacturing a microfluidic module.

FIG. 11 illustrates an example of a process of manufacturing a microfluidic module, for example, an electrode module having an electrode. First, (i) parts of a microfluidic module are printed out by the 3D printer, (ii) electrode parts are coated with copper tape, and (iii) the parts of the microfluidic module are assembled to thereby primarily complete a desired microfluidic module. (iv) The primarily completed microfluidic module is subjected to spin coating by applying epoxy to an upper end of the microfluidic module, (v) a transparent film is attached to the applied epoxy, and (vi) the process of (iv)-(v) is carried out again with regard to a lower end of the microfluidic module, thereby completing a desired microfluidic module.

The present drawing illustrates the case of manufacturing the electrode module having the electrode by way of example. Alternatively, when the microfluidic module has no electrodes, i.e., does not have an additional function, only the process of (iv) to (vi) is carried out without the process of (i) to (iii).

Figure 12:
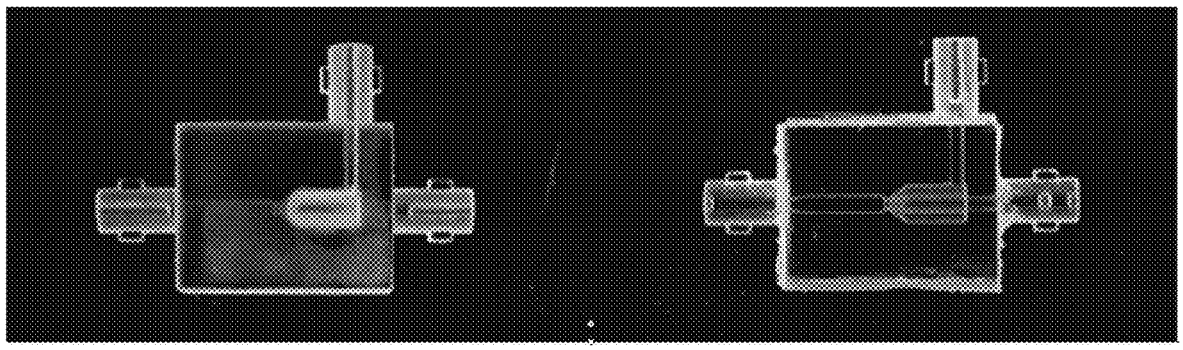
FIGS. 12(a) and 12(b) illustrate an example of a microfluidic module before and after attaching a transparent film, respectively.

FIGS. 12(a) and (b) illustrate an example of a microfluidic module before and after attaching a transparent film, respectively. As shown therein, the interior channel of the microfluidic module looks blurry due to the surface roughness of the microfluidic module before attaching the transparent film, but the interior channel of the microfluidic module looks clear after attaching the transparent film.

Like this, the microfluidic modules modularized according to the functions may be combined as necessary, so that a microfluidic system can be freely embodied and utilized from a simple structure to a complicated structure, and 2D arrangement to 3D arrangement.

For example, FIGS. 6(a) to 9 illustrate examples of various droplet generators embodied using a microfluidic system, and droplets generated by these droplet generators.

FIGS. 6(a) and (b) illustrate examples of a single droplet generator provided to generate a single droplet in a flowing fluid at predetermined intervals, for example, as shown in FIG. 6(b). In the single droplet generator shown in FIG. 6(a), an inlet/outlet module of FIG. 5(a) provided with an inlet through which a fluid is injected, a droplet generation module of FIG. 5(k), and an inlet/outlet module of FIG. 5(a) provided with an outlet through which the fluid is discharged are coupled in a flowing direction of the fluid, and an inlet/outlet module of FIG. 5(a) provided with an inlet through which a droplet generating fluid is injected into the droplet generator is coupled to the connector positioned at the upper end of the droplet generator. FIGS. 6(a) and (b) illustrate the minimum modules desired for generating a single droplet, but other modules may be additionally coupled in between as necessary.

FIGS. 7(a) and (b) illustrate an example of a droplet generator provided to generate single droplets forming two rows in a flowing fluid at predetermined intervals, as shown in FIG. 7(b), in which two single droplet generators are coupled in parallel. In each individual single droplet generator of this droplet generator shown in FIG. 7(a), the inlet/outlet module of FIG. 5(a) provided with the inlet through which a fluid is injected, the droplet generation module of FIG. 5(k), and the inlet/outlet module of FIG. 5(a) provided with the outlet through which the fluid is discharged are coupled in a flowing direction of the fluid, and the inlet/outlet module of FIG. 5(a) provided with the inlet through which the droplet generating fluid is injected into the droplet generator is coupled to the connector positioned at the upper end of the droplet generator. Unlike that shown in FIG. 6(a), this droplet generator further includes a module functioning to join the fluids flowing through two droplet generation modules between the droplet generation module and the inlet/outlet module for discharging the fluid, and a connection module functioning to connect this module and the inlet/outlet module. Of course, other modules may be additionally coupled in between as necessary.

Figure 8:
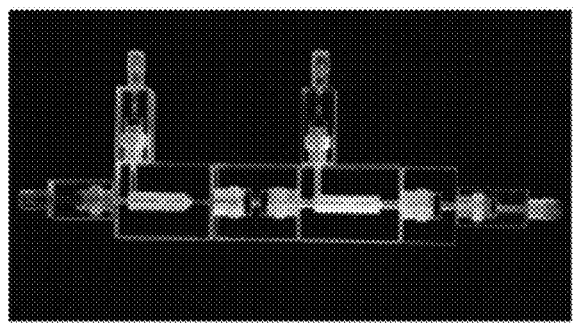
Figure 8:
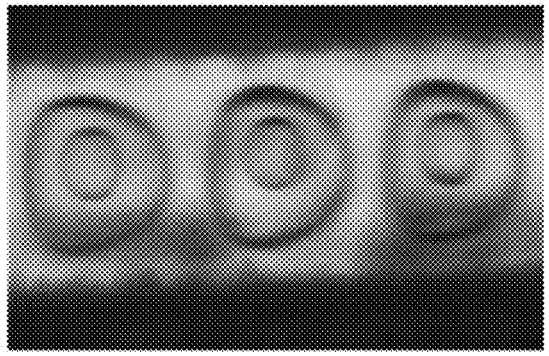

FIGS. 8(a) and (a) illustrate a droplet generator provided to generate dual droplets in a flowing fluid at predetermined intervals, as shown in FIG. 8(b), in which two single droplet generators are coupled in sequence. In this dual-droplet generator shown in FIG. 8(*a*), the inlet/outlet module of FIG. 5(*a*) provided with the inlet through which a fluid is injected, the droplet generation module of FIG. 5(*k*), and the inlet/outlet module of FIG. 5(*a*) provided with the outlet through which the fluid is discharged are coupled in a flowing direction of the fluid, and the inlet/outlet module FIG. 5(*a*) provided with the inlet through which the droplet generating fluid is injected into the droplet generator is coupled to the connector positioned at the upper end of the droplet generator. Unlike that shown in FIG. 6(*a*), this droplet generator further includes a droplet generation module between the droplet generation module and the inlet/outlet module for discharging the fluid, a connection module for connecting two droplet generation modules to both ends of this additional droplet generation module, and a connection module functioning to connect the additional droplet generation module and the inlet/outlet module. Of course, other modules may be additionally coupled in between as necessary.

Figure 9:
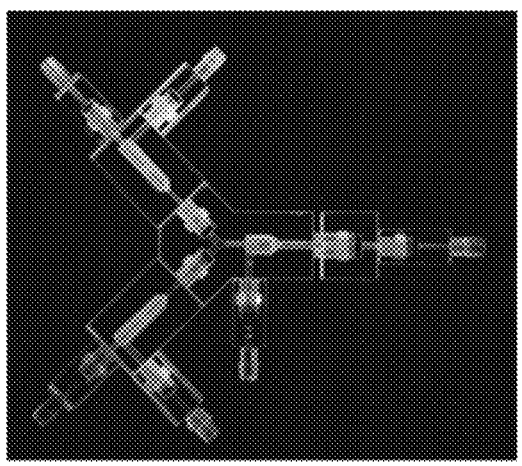
Figure 9:
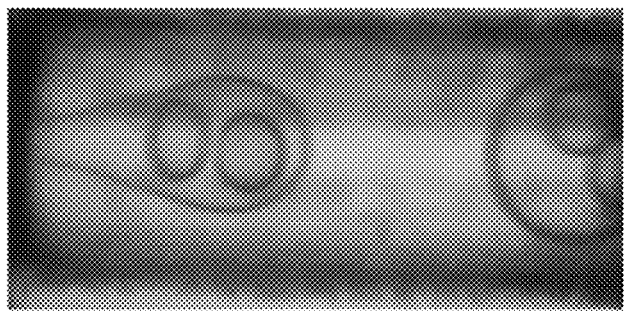

FIGS. 9(*a*) and (*b*) illustrate an example of a droplet generator provided to generate dual droplets having two cores in a flowing fluid at predetermined intervals in a flowing fluid, as shown in FIG. 9(*b*). In this dual-droplet generator shown in FIG. 9(*a*), unlike that shown in FIG. 6(*a*), a dual droplet generation module of FIG. 5(*l*) provided with two connectors into which a fluid is injected is coupled instead of the droplet generation module of FIG. 5(*k*), and the droplet generation module of FIG. 5(*k*) coupled to the inlet/outlet module of FIG. 5(*a*) provided with the inlet through which the fluid is injected is coupled to the dual droplet module having two connectors into which the fluid is injected. Of course, other modules may be additionally coupled in between as necessary.

Figure 10:
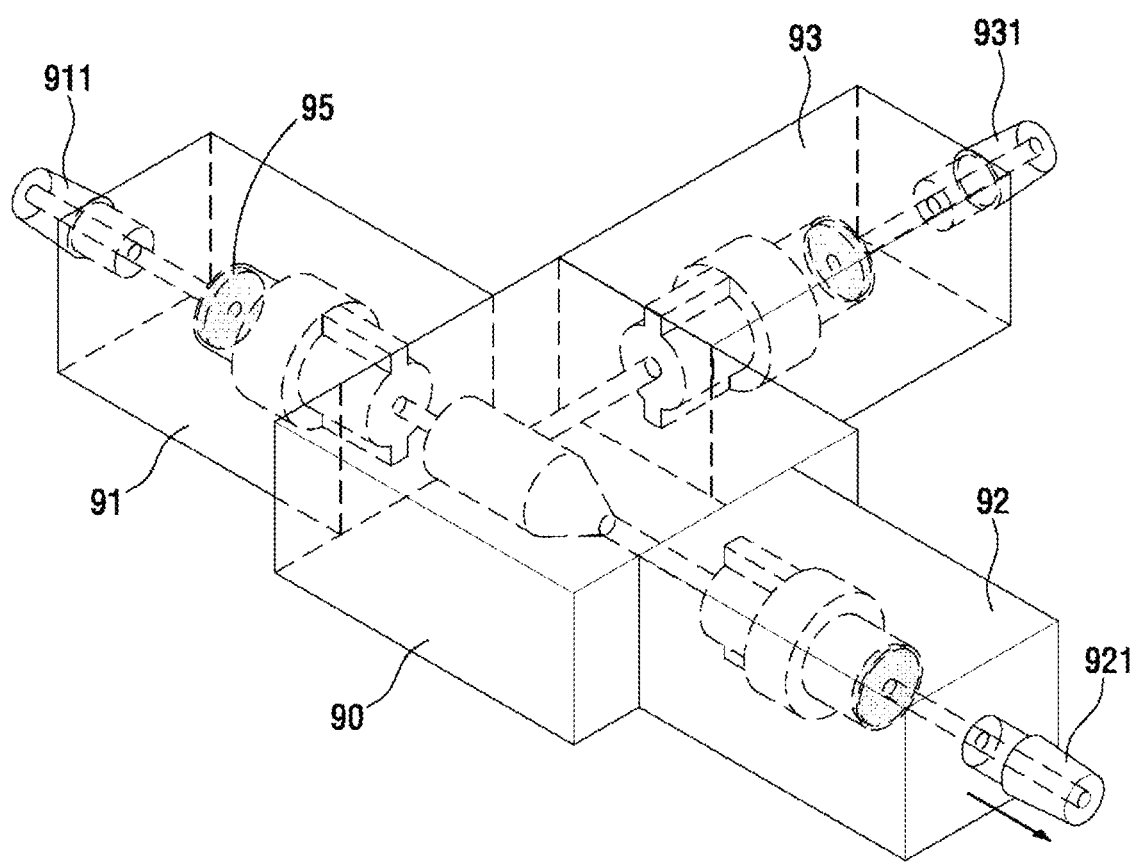
FIG. 10 illustrates an example of coupling in a microfluidic system.

FIG. 10 illustrates details of an example of coupling in a microfluidic system. For example, this microfluidic system may correspond to the single droplet generator of FIG. 6(*a*), in which, as described above, an inlet/outlet module 91 provided with an inlet 911 through which a fluid is injected, a droplet generation module 90, and an inlet/outlet module 92 provided with an outlet 921 through which the fluid is discharged are coupled in a flowing direction of the fluid, and an inlet/outlet module 93 provided with an inlet 931 through which a droplet generating fluid is injected into the droplet generation module 90 is coupled to the connector positioned at the upper end of the droplet generation module 90.

In this example, the inlet/outlet modules 91, 92 and 93 are formed with female connectors as shown in FIG. 5(*a*), the droplet generation module 90 is formed with male connectors as shown in FIG. 5(*k*), and thus these modules may be coupled to each other. As described above, the coupling is achieved by inserting the protrusion 121 of the male connector up to the empty space inside the locker 222 along the guider 221 of the female connector, and then rotating the male connector at a predetermined angle, so that the protrusion 121 can be locked in the empty space as caught on a locking portion corresponding to the thickness of the locker 222 and thus prevented from being inadvertently separated. For better sealing, an O-ring 95 is provided between the female connector and the male connector.

As described above, a modular microfluidic system according to the disclosure is easy to assemble and disassemble.

Further, a modular microfluidic system according to the disclosure makes no leakage.

The terms used in this disclosure are generally intended as "open" terms in particular in claims (e.g. the bodies of the claims) (for example, "including" needs to be construed as meaning "including without limitations," "having" needs to be construed as meaning "at least having", and "comprising" needs to be construed as meaning "comprising without limitations." When a specific number is intentionally given in claims, the intention is explicitly described in the claims. On the other hand, no explicit description is construed as absence of the intention.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A modular microfluidic system, comprising:
    a first microfluidic module having a first module body comprising a microfluidic channel and a first connector extending outward from the module body, wherein the first connector is provided with a protrusion; and
    a second microfluidic module having a second module body comprising a microfluidic channel, a second connector comprising a guider configured to guide the protrusion upon insertion of the first connector into the second module body, and a locker configured to fix the protrusion,
    wherein, upon fluidly coupling the first microfluidic module and the second microfluidic module, an O-ring is disposed between the first connector and the second connector.

2. The modular microfluidic system of claim 1, wherein the O-ring seals fluid flowing through the first microfluidic module and the second microfluidic module from leaking.

3. The modular microfluidic system of claim 1, wherein, upon engaging the first microfluidic module and the second microfluidic module, the protrusion guided along the guider is rotatable at a predetermined angle and lockable to the locker.

4. The modular microfluidic system of claim 3, wherein the second connector further comprises an accommodating portion configured to accommodate a portion of the first connector corresponding to an upper end of the protrusion and the O-ring.

5. The modular microfluidic system of claim 3, wherein the O-ring is compressable to have a width of about 70% of a depth of the O-ring when the first microfluidic module and the second microfluidic module are coupled, wherein the depth of the O-ring is a diameter of the O-ring.

6. The modular microfluidic system of claim 4, wherein the O-ring is compressable to have a width of about 70% of a depth of the O-ring when the first microfluidic module and the second microfluidic module are coupled, wherein the depth of the O-ring is a diameter of the O-ring.

7. The modular microfluidic system of claim 5, wherein each of the first and the second microfluidic modules is manufacturable by a 3D printer, and transparent films are attached to upper and lower ends of the first and the second microfluidic modules.

8. A modular microfluidic system, comprising:
- a first microfluidic module comprising a microfluidic channel and a first connector extending outward from the first microfluidic module, wherein a side surface of the first connector comprises a protrusion;
- a second microfluidic module comprising a microfluidic channel, a second connector comprising a guider configured to guide the protrusion upon insertion of the first connector into the second microfluidic module, and a locker configured to fix the protrusion; and
- a resilient member having a through hole, wherein the resilient member is disposed between the first microfluidic module and the second microfluidic module to fluidly communicate the first microfluidic module with the second microfluidic module.

9. The modular microfluidic system of claim 8, wherein, upon engaging the first microfluidic module and the second microfluidic module, the protrusion guided along the guider is rotatable at a predetermined angle and lockable to the locker.

10. The modular microfluidic system of claim 8, wherein the second connector further comprises an accommodating portion configured to accommodate a portion of the first connector corresponding to an upper end of the protrusion and the resilient member.

11. The modular microfluidic system of claim 8, wherein the resilient member is compressable to have a width of about 70% of a diameter of the resilient member when the first microfluidic module and the second microfluidic module are fluidly coupled.

* * * * *